US012000742B2

(12) United States Patent
Lopatin et al.

(10) Patent No.: US 12,000,742 B2
(45) Date of Patent: Jun. 4, 2024

(54) PRESSURE GAUGE COMPRISING A PRESSURE SENSOR HAVING A DEFLECTION DEVICE BEING CONTROLLED TO APPLY A FORCE TO AN ISOLATION DIAPHRAGM

(71) Applicant: Endress+Hauser SE+Co. KG, Maulburg (DE)

(72) Inventors: Sergey Lopatin, Lörrach (DE); Igor Getman, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 370 days.

(21) Appl. No.: 17/415,506

(22) PCT Filed: Nov. 21, 2019

(86) PCT No.: PCT/EP2019/082052
§ 371 (c)(1),
(2) Date: Jun. 17, 2021

(87) PCT Pub. No.: WO2020/126289
PCT Pub. Date: Jun. 25, 2020

(65) Prior Publication Data
US 2022/0042869 A1 Feb. 10, 2022

(30) Foreign Application Priority Data

Dec. 20, 2018 (DE) ..................... 10 2018 133 056.1

(51) Int. Cl.
*G01L 19/00* (2006.01)
*G01L 19/04* (2006.01)
(Continued)

(52) U.S. Cl.
CPC .......... *G01L 19/0046* (2013.01); *G01L 19/04* (2013.01); *G01L 27/002* (2013.01); *G01L 9/0052* (2013.01)

(58) Field of Classification Search
None
See application file for complete search history.

(56) References Cited

U.S. PATENT DOCUMENTS

| 3,492,872 A | 2/1970 | Caspar et al. |
| 6,382,031 B1 | 5/2002 | Mast et al. |
| (Continued) | | |

FOREIGN PATENT DOCUMENTS

| CN | 1849503 A | 10/2006 |
| CN | 101322020 A | 12/2008 |
| (Continued) | | |

*Primary Examiner* — Peter J Macchiarolo
*Assistant Examiner* — Jermaine L Jenkins
(74) *Attorney, Agent, or Firm* — Kelly J. Smith; Endress+Hauser (USA) Holding, Inc.

(57) ABSTRACT

Disclosed is a pressure gauge comprising a pressure sensor, a pressure transmitter connected upstream of the pressure sensor and having an isolation diaphragm, the outer side of which can be supplied with pressure and under which a pressure receiving chamber is enclosed, and comprising a hydraulic pressure transmission path connected to the pressure receiving chamber and filled with a pressure transmitting fluid. The diaphragm seal comprises a deflection device actuated by a controller connected to the pressure sensor and/or to a temperature sensor, and which is designed to exert a force on the isolation diaphragm, or on an element connected to the isolation diaphragm, said force deflecting the isolation diaphragm in the direction of its diaphragm bed, at times that are determined by the controller and that (Continued)

are based on a pressure measured continuously by the pressure sensor and/or a temperature measured continuously by the temperature sensor.

14 Claims, 3 Drawing Sheets

(51) Int. Cl.
  *G01L 27/00* (2006.01)
  *G01L 9/00* (2006.01)

(56) References Cited

U.S. PATENT DOCUMENTS

| | | | |
|---|---|---|---|
| 6,813,954 B2 * | 11/2004 | Gokhfeld | G01L 13/025 |
| | | | 73/718 |
| 8,813,572 B2 * | 8/2014 | Hedtke | G01L 9/0072 |
| | | | 73/728 |
| 2007/0095146 A1 | 5/2007 | Brosh | |

FOREIGN PATENT DOCUMENTS

| | | |
|---|---|---|
| CN | 202853817 U | 4/2013 |
| CN | 207556734 U | 6/2018 |
| CN | 108351267 A | 7/2018 |
| DE | 3106835 A1 | 9/1982 |
| DE | 3705901 A1 | 9/1988 |
| DE | 102005055285 A1 | 5/2007 |
| DE | 102010035965 A1 | 3/2012 |
| JP | S5827038 A | 2/1983 |
| WO | 2005026682 A1 | 3/2005 |

* cited by examiner

PRESSURE GAUGE COMPRISING A PRESSURE SENSOR HAVING A DEFLECTION DEVICE BEING CONTROLLED TO APPLY A FORCE TO AN ISOLATION DIAPHRAGM

CROSS-REFERENCE TO RELATED APPLICATIONS

The present application is related to and claims the priority benefit of German Patent Application No. 10 2018 133 056.1, filed on Dec. 20, 2018 and International Patent Application No. PCT/EP2019/082052, filed on Nov. 21, 2019, the entire contents of which are incorporated herein by reference.

TECHNICAL FIELD

The invention relates to a pressure gauge, comprising
a pressure sensor, and
a pressure transmitter connected upstream of the pressure sensor and having an isolation diaphragm, to the outer side of which a pressure can be applied and beneath which a pressure receiving chamber is enclosed, and
a hydraulic pressure transmission path which is connected to the pressure receiving chamber and filled with a pressure transmitting fluid, and which transmits the pressure acting on the outer side of the isolation diaphragm to the pressure sensor.

BACKGROUND

Pressure gauges are used in a large number of different industries for measuring pressures.

In pressure gauges of the type mentioned at the outset, the fluid which transmits the pressure is under an internal pressure prevailing in the hydraulic pressure transmission path. This internal pressure follows the pressure to be measured acting from the outside on the isolation diaphragm and consequently is lower the lower the pressure to be measured. At the same time, the fluid which transmits the pressure to be measured has a pressure- and temperature-dependent vapor pressure which causes a gas phase to form in the hydraulic pressure transmission path, which is all the more pronounced the lower the internal pressure, and which is all the more pronounced the higher the temperature is to which the fluid is exposed. The stronger the gas phase is, the more strongly it impairs the pressure transmission properties of the hydraulic pressure transmission path. Impairments to the pressure transmission properties lead to a corresponding deterioration of the measuring accuracy achievable with the pressure gauge.

Accordingly, pressure gauges of the type mentioned at the outset can only be used for measuring pressures which are greater than a minimum pressure dependent on the vapor pressure of the fluid used.

Moreover, they can only be used at temperatures which are lower than a maximum temperature dependent on the vapor pressure of the fluid used. Both individually and in combination, they lead to a restriction of the field of use in which pressure gauges of the type mentioned at the outset can be used.

It is an object of the invention to provide a pressure gauge of the type mentioned at the outset which can be used in a larger field of application.

SUMMARY

To this end, the invention comprises a pressure gauge having
a pressure sensor,
a pressure transmitter connected upstream of the pressure sensor and having an isolation diaphragm, to the outer side of which a pressure can be applied and beneath which a pressure receiving chamber is connected, and
a hydraulic pressure transmission path which is connected to the pressure receiving chamber and filled with a pressure transmitting fluid, and which transmits the pressure acting on the outer side of the isolation diaphragm to the pressure sensor,
which is characterized in that the pressure transmitter comprises a deflection device which can be controlled by means of a controller connected to the pressure sensor and/or to a temperature sensor and which is designed to apply a force to the isolation diaphragm or an element connected to the isolation diaphragm, said force deflecting the isolation diaphragm in the direction of its diaphragm bed, at times that are determined by the controller and that are based on a pressure measured continuously by the pressure sensor and/or a temperature measured continuously by the temperature sensor.

Pressure gauges according to the invention offer the advantage that a force applied to the isolation diaphragm by means of the deflection device acts on the entire pressure gauge like a pressure increase corresponding to the force of the pressure acting on the outside of the isolation diaphragm. The application of the force thus leads to an increase in the internal pressure corresponding to the force which counteracts the formation of the gas phase. The force thus acts with respect to the formation of the gas phase in precisely the same way as a pressure increase of the pressure to be measured at a constant temperature or a temperature reduction of the temperature occurring with a constant pressure to be measured. This leads to pressure gauges according to the invention being able to be used in a larger field of application than identical pressure gauges without a deflection device controlled in the above-mentioned manner.

A further advantage is that the force is applied directly to the isolation diaphragm or the element connected thereto. As a result, the said force can be prespecified in a defined manner independently of the pressure acting on the isolation membrane, of the temperature and of the pressure transmission properties of the fluid.

A first development of the pressure gauge is characterized in that
the isolation diaphragm is magnetic or ferromagnetic or is connected to a magnetic or ferromagnetic element, and
the deflection device comprises an electromagnet which is designed to apply the force, which deflects the isolation diaphragm in the direction of its diaphragm bed, at times prespecified by the controller, to the magnetic or ferromagnetic isolation diaphragm or to the magnetic or ferromagnetic element connected to the isolation diaphragm.

A development of the first development is characterized in that
the electromagnet is integrated in the pressure transmitter,
a coil of the electromagnet is oriented such that an extension of its longitudinal axis parallel to the surface normal runs onto the isolation diaphragm through the center of the isolation diaphragm, the coil is arranged such that it surrounds externally on all sides a section of the pressure transmission path running from the pressure receiving chamber to the pressure sensor, and/or the electromagnet comprises a hollow cylindrical core which is surrounded at least in sections by the coil and through which an end region of the hydraulic pressure transmission path leading into the pressure receiving chamber extends.

A further development of the first development is characterized in that the pressure gauge comprises a deflection measuring circuit which can be connected or is connected to the electromagnet and is designed such that it determines a deflection of the isolation diaphragm dependent on the pressure acting on the isolation diaphragm when the deflection device is deactivated, on the basis of a property of the electromagnet dependent on the deflection of the isolation diaphragm, on the basis of an inductance of the electromagnet, or on the basis of a variable dependent on the inductance of the electromagnet, and comprises a testing device designed in such a way that it checks the functionality and/or the measuring accuracy of the pressure gauge when the deflection device is deactivated, doing so on the basis of the pressure measured by the pressure sensor and the deflection of the isolation diaphragm determined in parallel thereto by the deflection measuring circuit.

A second development is characterized in that the isolation diaphragm consists of a stainless steel or an austenitic stainless steel, or the isolation diaphragm at least in sections or as a whole consists of a magnetic material, of a ferromagnetic material, of a ferromagnetic steel, of a ferritic steel, of a duplex steel or of a superduplex steel.

A third development is characterized in that the magnetic or ferromagnetic element connected to the isolation diaphragm comprises a disk arranged on an inner side of the isolation diaphragm pointing into the pressure receiving chamber, wherein the disk a) consists of a magnetic or ferromagnetic material, of a magnetic or ferromagnetic alloy, of a ferromagnetic steel, of a ferritic steel, of a duplex steel, of a superduplex steel, of iron, of cast iron, of a magnetic or ferromagnetic ceramic, of a ferritic ceramic or of an iron oxide, b) is applied as a coating or as a galvanic coating to the isolation diaphragm or is connected to the isolation diaphragm by joining or soldering, c) with a material thickness of the isolation diaphragm (5) from 25 µm to 200 µm, will have a disk thickness from 0.1 µm to 500 µm; with a material thickness of the isolation diaphragm (5) from 25 µm to 100 µm will have a disk thickness from 0.1 µm to 300 µm; or with a material thickness of the isolation diaphragm from 50 µm to 200 µm will have a disk thickness from 10 µm to 500 µm, and/or d) has a diameter which is less than a diameter of the isolation diaphragm and/or has a diameter from 2 mm to 15 mm when the isolation diaphragm has a diameter from 20 mm to 90 mm, wherein the disk is arranged concentrically with respect to the isolation diaphragm.

A fourth development is characterized in that the element connected to the isolation diaphragm comprises a permanent magnet mounted on an inner side of the isolation diaphragm pointing into the pressure receiving chamber.

A development of the fourth development is characterized in that the permanent magnet extends into an end region of the pressure transmission path adjacent to the pressure receiving chamber, which is surrounded externally at least in sections by a coil of the electromagnet.

A fifth development is characterized in that the electromagnet is oriented in such a way that the magnetic attraction force which can be applied therewith to the isolation diaphragm or to the element connected on the inside of the isolation diaphragm to the central region of the isolation diaphragm surrounding the isolation diaphragm center is maximal in a direction running parallel to the surface normal on the isolation diaphragm through a center of the isolation diaphragm. A sixth development is characterized in that the controller and the deflection device are designed in such a way that the deflection device can be switched on and off by the controller and/or the deflection device when switched on applies to the isolation diaphragm either a constant force of a predefined magnitude or a force of a magnitude predefined by means of the controller.

Further developments are characterized in that a) the controller is designed in such a way that it switches on the deflection device as a function of the pressure measured by the pressure sensor when the pressure measured by means of the pressure sensor falls below a predefined lower limit, and switches off the deflection device when the pressure measured by the pressure sensor when the deflection device is switched on exceeds a predefined upper limit, b) the controller is designed in such a way that it switches on the deflection device when the temperature measured by means of the temperature sensor when the deflection device is switched off exceeds a predefined temperature upper limit, and switches off the deflection device when the temperature measured by means of the temperature sensor when the deflection device is switched on falls below a predefined temperature lower limit, or c) the controller is designed in such a way that it c1) determines an auxiliary quantity on the basis of the measured pressure and the measured temperature by subtracting from the measured pressure a value which is dependent on the measured temperature and rises with increasing temperature, c2) switches on the deflection device when the auxiliary quantity determined when the deflection device is switched off falls below a predefined auxiliary quantity lower limit, and c3) switches off the deflection device when the auxiliary quantity determined when the deflection device is switched on exceeds a predefined auxiliary quantity upper limit.

A development of the developments last mentioned is characterized in that a) the upper limit is genuinely higher than the sum of the lower limit and a pressure increase of the measured pressure caused by the force, b) the temperature upper limit is genuinely higher than the lower temperature limit, or c) the auxiliary quantity upper limit is genuinely higher than the sum of the auxiliary quantity lower limit and a pressure increase of the measured pressure caused by the force.

A seventh development is characterized in that the controller is designed in such a way that it gradually or continuously adjusts the level of the force applied by the deflection device on the basis of the measured pressure and/or the measured temperature, as well as the level of the force previously applied to the isolation membrane or the element connected thereto.

An eighth development is characterized in that the pressure gauge is designed such that it outputs a pressure measurement result which corresponds to the pressure measured by means of the pressure sensor when the deflection device is switched off, and which corresponds to a difference between the pressure measured by the pressure sensor and a pressure increase of the measured pressure caused by the force.

BRIEF DESCRIPTION OF THE DRAWINGS

The invention and its advantages will now be explained in detail using the figures in the drawing, which show three exemplary embodiments. The same elements are provided with the same reference signs in the figures. In order to be able to show components which sometimes have very different sizes, an illustration that is not always true-to-scale has been selected.

DETAILED DESCRIPTION

Figure 1:
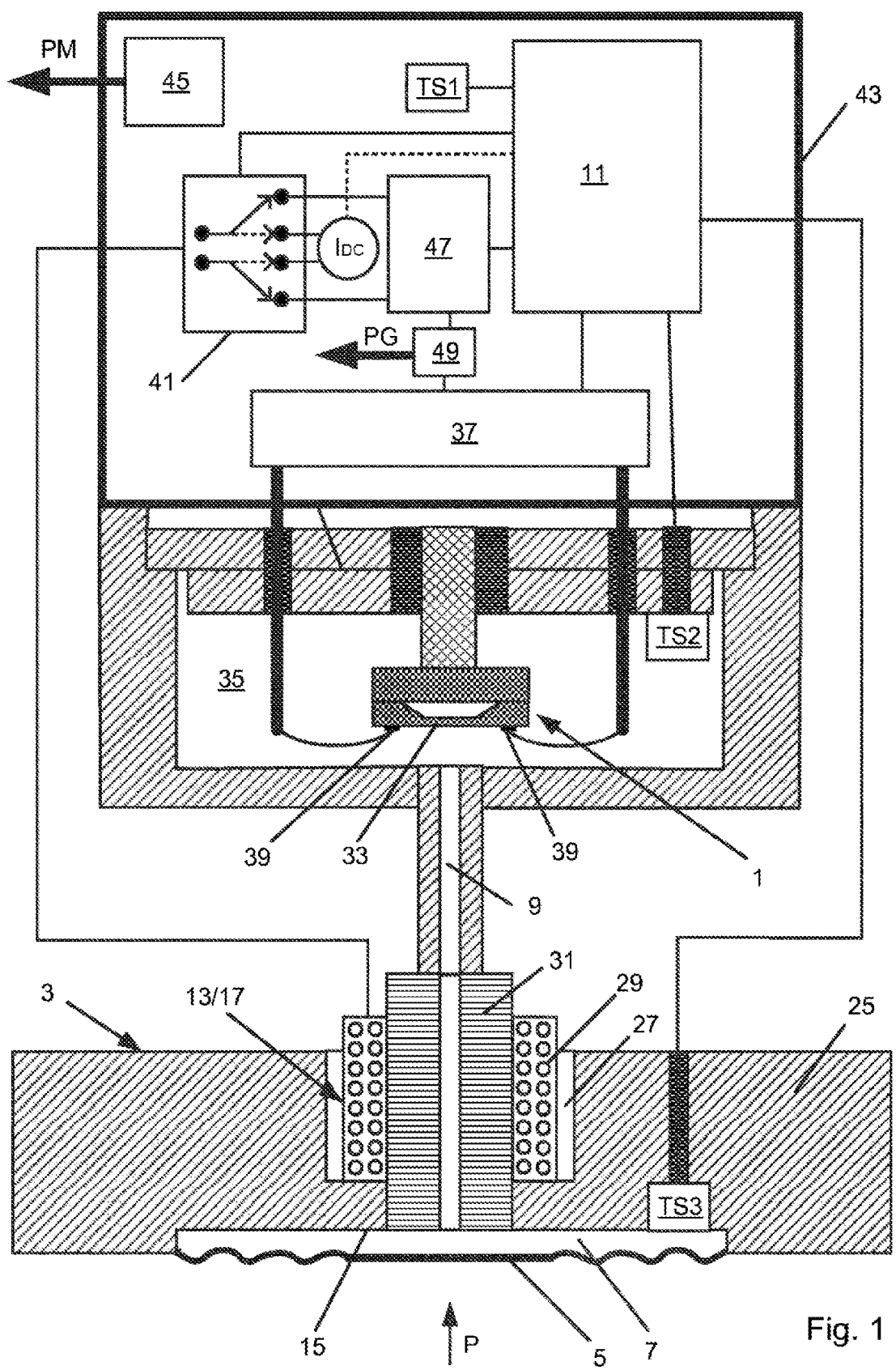
FIG. 1 shows a pressure gauge having a pressure transmitter with a magnetic or ferromagnetic isolation diaphragm.

FIG. 1 shows an example of a pressure gauge according to the invention comprising a pressure sensor 1 and a pressure transmitter 3 upstream of the pressure sensor 1. The pressure transmitter 3 comprises an isolation diaphragm 5, the outer side of which can be acted on by a pressure p to be measured by the pressure gauge. A pressure receiving chamber 7 is enclosed below the isolation diaphragm 5. Connected to the pressure receiving chamber 7 is a hydraulic pressure transmission path 9 which is filled with a pressure transmitting fluid and transmits to the pressure sensor 1 the pressure p acting on the outer side of the isolation diaphragm 5.

Pressure gauges according to the invention are characterized in that their pressure transmitter 3 comprises a deflection device 13 which can be controlled by means of a controller 11 connected to the pressure sensor 1 and/or to a temperature sensor TS1, TS2, TS3 and which is designed to apply a deflecting force K to the isolation diaphragm 5 in the direction of its diaphragm bed 15, at times that are determined by the controller 11 and that are based on a pressure $p_{gem}$ continuously measured by the pressure sensor 1 and/or a temperature continuously measured by the temperature sensor TS1, TS2, TS3.

Pressure gauges according to the invention have the advantages mentioned at the outset. Individual components can have different embodiments that can be used individually or also in combination with one another.

A particularly preferred embodiment shown in FIG. 1 provides that the isolation diaphragm 5 is magnetic or ferromagnetic and the deflection device 13 comprises an electromagnet 17 which is designed, at times predefined by the controller, to apply to the isolation diaphragm 5 the force K, which deflects the isolation diaphragm 5 in the direction of its diaphragm bed 15.

In said embodiment, the isolation diaphragm 5 consists at least in sections, but preferably entirely, of a magnetic or ferromagnetic material. In this respect, the isolation diaphragm 5 can consist, for example, of a magnetic alloy, of a ferromagnetic alloy, of a ferromagnetic steel, of a ferritic steel, of a duplex steel or of a superduplex steel.

This embodiment offers the advantage that no components which change the pressure transmission properties of the isolation diaphragm 5 are required for generating the force K which deflects the isolation diaphragm 5.

Alternatively, the isolation diaphragm 5 can be connected to a magnetic or ferromagnetic element and the deflection device 13 can comprise an electromagnet 17 which is designed, at times prespecified by the controller, to apply to the element connected to the isolation diaphragm 5 the magnetic force K, which deflects the isolation diaphragm 5 in the direction of its diaphragm bed 15.

Figure 2:
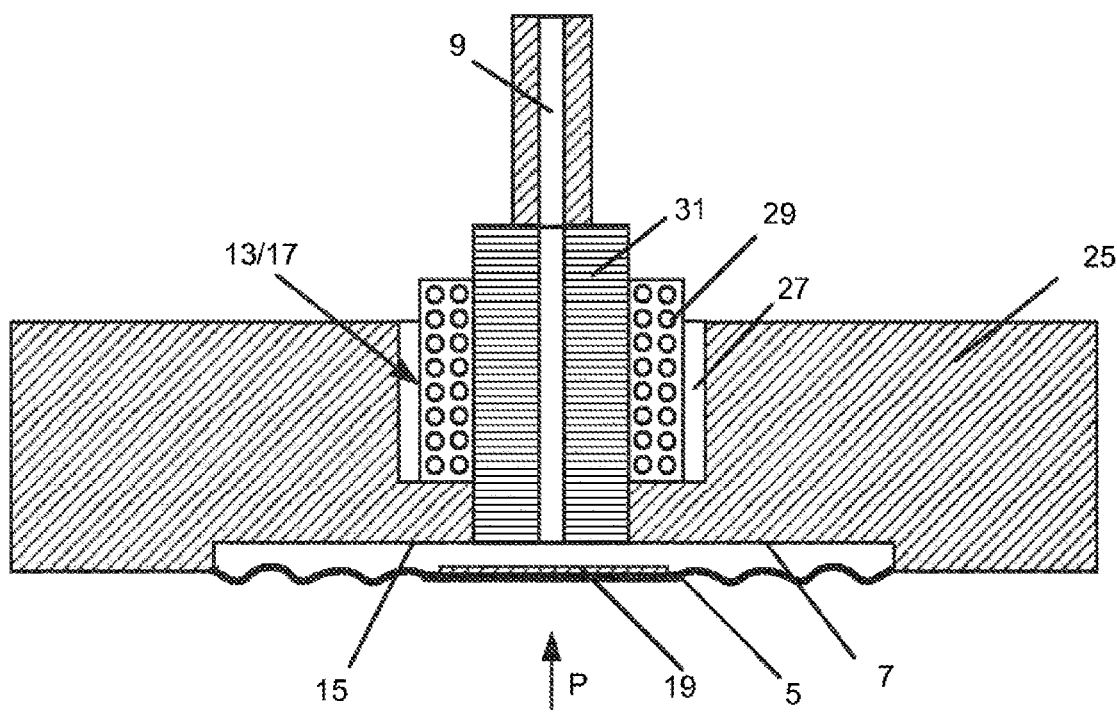
FIG. 2 shows a pressure transmitter on whose isolation diaphragm a magnetic or ferromagnetic disk is arranged.

As an example thereof, FIG. 2 shows a pressure transmitter which can be used instead of the pressure transmitter 3 shown in FIG. 1, in which a magnetic or ferromagnetic disk 19 connected to the isolation diaphragm 5 is arranged on an inner side of the isolation diaphragm 5 pointing into the pressure receiving chamber 7. This embodiment offers the advantage that the material of the isolation diaphragm 5 is freely selectable within further limits and the isolation diaphragm 5 can optionally also consist of a non-magnetic material such as, for example, a stainless steel, especially an austenitic stainless steel.

A disk 19 made of a magnetic or ferromagnetic material is suitable as the disk 19. In this respect, the disk 19 can consist, for example, of a magnetic or ferromagnetic metallic alloy, of a ferromagnetic steel, of a ferritic steel, of a duplex steel, of a superduplex steel, of iron or of cast iron. Alternatively, however, the disk 19 can also consist of a magnetic or ferromagnetic ceramic or of a ferritic ceramic, such as, for example, an iron oxide.

Depending on the thickness and the material of the disk 19, the disk 19 can be applied to the isolation diaphragm 5, for example as a coating, for example as a galvanic coating, or can be connected to the isolation diaphragm 5 by joining, such as soldering.

As an alternative or in addition, the disk 19 preferably has a layer thickness from 0.1 µm to 500 µm. In comparison thereto, the isolation diaphragm 5 can have, for example, a material thickness in the range from 25 µm to 200 µm. In this case, the greater the pressures p to be measured by means of the pressure gauge, the greater the material thickness of the isolation diaphragm 5 to preferably be set. In this respect, with a material thickness of the isolation diaphragm 5 from 25 µm to 100 µm, the disk 19 will preferably have a disk thickness from 0.1 µm to 300 µm, whereas with a material thickness of the isolation diaphragm 5 from 50 µm to 200 µm, it preferably will have a disk thickness from 10 µm to 500 µm.

In principle, in the case of a comparatively small disk thickness the disk 19 can be applied to the isolation diaphragm 5 as a full-area coating. Preferably, however, the disk 19 arranged concentrically to the isolation diaphragm 5 has a diameter which is less than a diameter of the isolation diaphragm 5. In this respect, with a diameter of the isolation diaphragm 5 from 20 mm to 90 mm, the disk 19 will preferably have a diameter from 2 mm to 15 mm. This embodiment offers the advantage that the pressure transmission properties of the isolation diaphragm 5 are changed only to a comparatively small extent by the disk 19, connected here only to a central diaphragm region of the isolation diaphragm 5, even if the thickness of the disk 19 is comparatively large and/or the disk thickness is greater than the material thickness of the isolation diaphragm 5.

Figure 3:
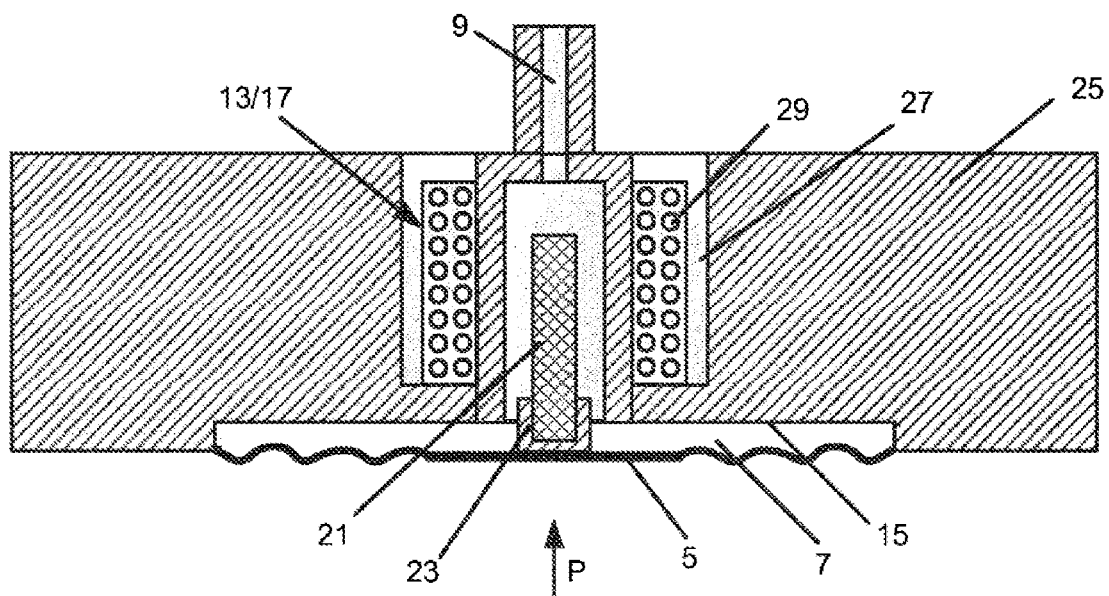
FIG. 3 shows a pressure transmitter with an isolation diaphragm connected to a permanent magnet.

FIG. 3 shows as a further example a pressure transmitter which can be used instead of the pressure transmitter 3 shown in FIG. 1, in which a permanent magnet 21 is mounted on an inner side of the isolation diaphragm 5 pointing into the pressure receiving chamber 7. This permanent magnet 21 can be mounted, for example, on a mounting 23 which is arranged on the inner side of the isolation diaphragm 5 and is connected to the isolation diaphragm 5.

This embodiment also offers the advantage that the isolation diaphragm 5 can optionally consist of a non-magnetic material such as, for example, a stainless steel, especially an austenitic stainless steel. Furthermore, it offers the advantage that, via the permanent magnet 21 connected to the isolation diaphragm 5, greater forces can be applied to the isolation diaphragm 5 by means of the electromagnet 17 than is possible with the variants shown in FIGS. 1 and 2.

Irrespective of whether the isolation diaphragm 5 is magnetic or ferromagnetic or is connected to a magnetic or ferromagnetic element, such as the disk 19 shown in FIG. 2 or the permanent magnet 21 shown in FIG. 3, the electromagnet 17 is preferably integrated in the pressure transmitter 3. This saves space and, due to the associated short distance between the electromagnet 17 and the magnetic or ferromagnetic isolation diaphragm 5 or the magnetic or ferromagnetic element connected to the isolation diaphragm 5, offers the advantage that the electromagnet 17 can apply correspondingly large forces K to the isolation diaphragm 5 on account of the short distance.

FIGS. 1 to 3 show examples in which the pressure transmitter 3 comprises a carrier 25, on the end face of which is arranged the pressure receiving chamber 7 closed to the outside by the isolation diaphragm 5. The carrier 25 has there on its rear side opposite the end face a recess 27 into which the electromagnet 17 or at least a portion of the electromagnet 17 is inserted.

Alternatively or in addition to the aforementioned developments, the electromagnet 17 is preferably oriented in such a way that the magnetic attraction force applied therewith to the isolation diaphragm 5 or the element connected thereto is maximal in a direction running parallel to the surface normal on the isolation diaphragm 5 through a center of the isolation diaphragm 5. In this case, the element possibly provided with the isolation diaphragm 5 is also preferably connected on the inside of the isolation membrane 5 to a central region of the isolation diaphragm 5 comprising the isolation diaphragm center. In this embodiment, the alignment of the force K on the isolation membrane center offers the advantage that the membrane deflection caused by a force K of predefined magnitude or of a magnitude prespecifiable by the controller 11 is thereby maximal.

FIGS. 1 to 3 show in this regard exemplary embodiments in which the electromagnet 17 in each case comprises a coil 29 which is oriented such that an extension of its longitudinal axis parallel to the surface normal runs on the isolation diaphragm 5 through the center of the isolation diaphragm 5. Alternatively, or in addition thereto, the coil 29 is preferably arranged in such a way that it surrounds externally on all sides a section of the pressure transmission path 9 running from the pressure receiving chamber 7 to the pressure sensor 1.

Optionally, the electromagnet 17 can comprise a core 31 which increases the force K that can be applied by means of the electromagnet 17 and is surrounded at least in sections by the coil 29. In this embodiment, shown in FIGS. 1 and 2, the core 31 is preferably hollow-cylindrical and arranged in such a way that an end region of the hydraulic pressure transmission path 9 adjacent to the pressure receiving chamber 7 passes through the core 31.

In the embodiment shown in FIG. 3, the pressure transmitter 3 is preferably designed in such a way that the permanent magnet 21 extends into an end region of the pressure transmission path 9, adjacent to the pressure receiving chamber 7, which is surrounded on the outside, at least in sections, by the coil 29 of the electromagnet 17. The permanent magnet 21 can, for example, be of rod-shaped design.

Pressure sensors known from the prior art can be used as pressure sensor 1. FIG. 1 shows as an example of this a pressure sensor 1 which comprises a measuring diaphragm 33 to be acted upon by the pressure to be measured. For this purpose, in the example shown here, the pressure sensor 1 is arranged in a pressure measuring chamber 35 which is connected to the pressure transmission path 9 and is likewise filled with the fluid which transmits the pressure, such that an internal pressure prevailing in the pressure measuring chamber 35 acts on the outside of the measuring diaphragm 33. In addition, the pressure sensor 1 comprises an electromechanical transducer, which converts the pressure-dependent deflection of the measuring diaphragm 33 into an electrical quantity. Connected to the transducer is a pressure measuring circuit 37 which detects the pressure-dependent quantity metrologically and provides a pressure $p_{gem}$ measured by means of the pressure sensor 1, for example in the form of a measured value corresponding to the measured pressure $p_{gem}$ or a corresponding measurement signal corresponding to the measured pressure $p_{gem}$.

FIG. 1 shows as an example a piezoresistive transducer comprising piezoresistive elements 39 connected into a bridge circuit. Alternatively, however, pressure sensors having a converter based on another transducer principle, such as a capacitive transducer, can also be used.

The controller 11 of pressure gauges according to the invention is designed to control the deflection device 13 in such a way that the deflection device 13 applies a deflecting force K to the isolation diaphragm in the direction of its diaphragm bed, at times that are determined by the controller 11 and that are based on a pressure $p_{gem}$ measured continuously by the pressure sensor 1 and/or or the temperature $T_{gem}$ measured continuously by the temperature sensor TS1, TS2, TS3.

In this case, the controller 11 and the deflection device 13 are preferably designed in such a way that the deflection device 13 can be switched on and off by means of the controller 11 and/or is designed such that the deflection device 13 applies to the isolation diaphragm 5 either a constant force K of prespecified magnitude or a force K of a magnitude prespecifiable by the controller 11. In the switched-off state, the deflection device 13 does not applies any force to the isolation diaphragm 5.

FIG. 1 shows an example of this in which the pressure gauge comprises an electronically controllable switching device 41 via which the deflection device 13 is switched on and off. This switching device 41 can take the form of a component of the controller 11 or can be connected to the controller 11 in such a way that it is controlled by the controller 11. FIG. 1 shows an exemplary embodiment in which the coil 29 can be connected via the switching device 41 to a direct current source IDC integrated in the pressure gauge. In the switched-on state, the electromagnet 17 applies a force K to the isolation diaphragm 5 or the element connected thereto, the magnitude of which can be adjusted on the basis of the magnitude of the current. In this respect, the direct current source IDC can be designed either in such a way that it generates a current of a predefined magnitude. In this case, the force K has a constant predefined value when the deflection device 13 is switched on. Alternatively, however, the direct current source IDC can also take the form of a direct current source IDC which can be regulated by means of the controller 11 and which generates a current of a magnitude which can be prespecified by means of the controller 11. In this embodiment, the magnitude of the force K is prespecified by the controller 11 via the regulatable magnitude of the current.

Control of the deflection device 13 can be effected in different ways depending on the intended use of the pressure gauge.

A variant of the invention provides that the controller 11 is designed such that it switches the deflection device 13 on and off as a function of the pressure $p_{gem}$ measured by the pressure sensor 1. For this purpose, the controller 11 can be connected to the pressure sensor 1 or to the pressure measuring circuit 37 or comprise the pressure measuring circuit 37.

In this variant, the controller 11 is preferably designed in such a way that it switches on the deflection device 13 when the pressure $p_{gem}$ measured when the deflection device 13 is switched off by the pressure sensor 1 falls below a prespecified lower limit $p_{min}$ and switches off the deflection device 13 when the pressure $p_{gem}$ measured by the pressure sensor 1 when the deflection device 13 is switched on exceeds a prespecified upper limit.

Figure 4:
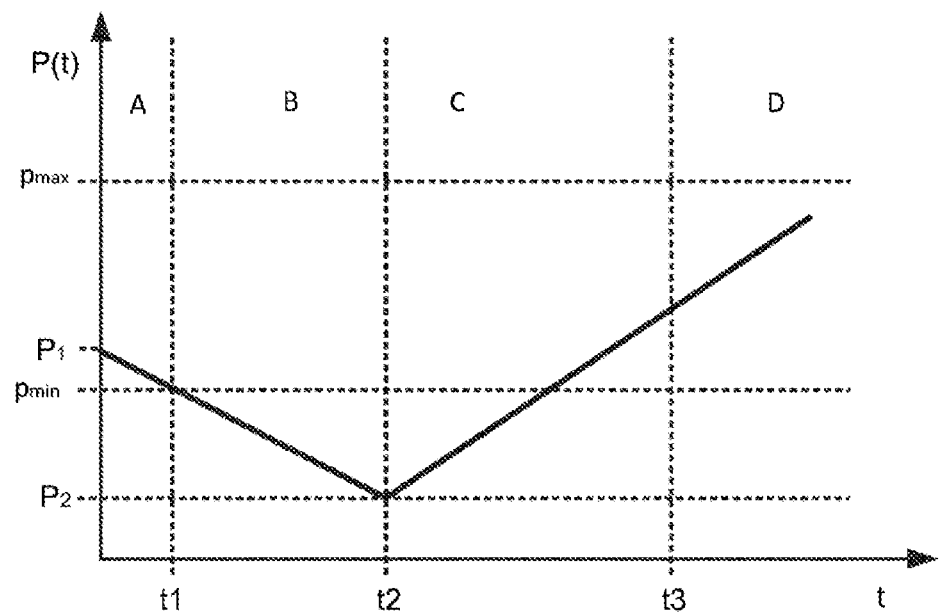
FIG. 4 shows a time profile of a pressure acting on an outside of a isolation membrane.
Figure 5:
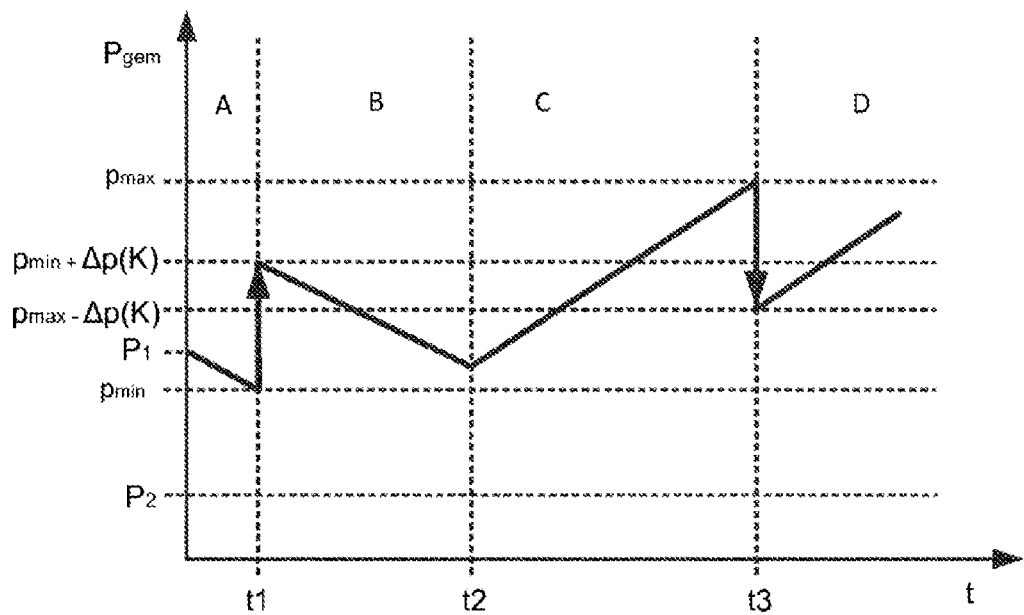
FIG. 5 shows an example of a pressure measured in the time period shown in FIG. 4 with a pressure sensor of a pressure gauge according to the present disclosure.

FIG. 4 shows in this regard an example of a time curve p(t) of the pressure p to be measured that is acting on the outside of the isolation diaphragm 5 which drops from a first pressure p1 lying above the lower limit $p_{min}$ to a second pressure p2 lying below the lower limit $p_{max}$ and then rises steadily. FIG. 5 shows the pressure $p_{gem}$ measured with the pressure sensor 1 at the same time in the time period shown in FIG. 4, as it results when the deflection device 13 is operated in such a way that in the switched-on state it applies a constant force K of predefined magnitude to the isolation diaphragm 5 or the element connected thereto.

The curve p(t) comprises a first time range A in which the pressure p to be measured is equal to the lower limit $p_{min}$. In this time range A, the deflection device 13 is switched off. Consequently, the pressure $p_{gem}(t)$ measured by the pressure sensor 1 coincides with the pressure p(t) to be measured and decreases continuously. At time t1, the pressure p(t1) to be measured and the measured pressure $p_{gem}(t1)$ fall below the lower limit $p_{min}$. This is detected by the controller 11 on the basis of the measured pressure $p_{gem}(t1)$ which thereupon switches on the deflection device 13. The switching-on of the deflection device 13 acts like a pressure increase $\Delta p(K)$ of the pressure p to be measured corresponding to the constant force K. Accordingly, the measured pressure $p_{gem}$ (t1) rises abruptly by the pressure increase $\Delta p(K)$ at time t1. In the next time range B, the pressure p to be measured decreases further up to time t2 and then rises again in the following time ranges C and D. The deflection device 13 here remains switched on until the measured pressure $p_{gem}$ (t3), which is now dependent on the constant force K and the pressure p to be measured, exceeds the upper limit $p_{max}$ at time t3. This is detected by the controller 11 on the basis of the measured pressure $p_{gem}(t3)$ which thereupon switches off the deflection device 13 again. The switching-off of the deflection device 13 acts like a pressure decrease of the pressure p to be measured corresponding to the force K arising thereby. Accordingly, the measured pressure $p_{gem}(t3)$ decreases abruptly at the time t3 by a pressure drop which is equal in absolute terms to the pressure increase $\Delta p(K)$ previously caused by the switching-on of the deflection device 13. Consequently, the pressure $p_{gem}(t)$ measured in the subsequent time period D again corresponds to the pressure p to be measured.

Optionally, the upper limit $p_{max}$ is preferably set such that it is genuinely greater than the sum of the lower limit $p_{min}$ and the pressure increase $\Delta p(K)$ caused by the force K of the measured pressure $p_{gem}$ (t). This offers the advantage that the limit value difference H1 between upper limit $p_{max}$ and lower limit $p_{min}$ ensures that stable measuring conditions are still present even if the pressure p to be measured fluctuates in time around the lower limit $p_{min}$ by less than the limit value difference H1 and/or in time around by less than the limit value difference by a value corresponding to the difference between the upper limit $p_{max}$ and the pressure increase $\Delta p(K)$.

Optionally, the controller 11 may be designed to gradually or continuously adjust the magnitude of the force K applied by the deflection device 13 on the basis of the measured pressure $p_{gem}$ and the magnitude of the force K previously applied to the isolation diaphragm 5 or the element connected thereto.

Control of the deflection device 13 on the basis of the measured pressure $p_{gem}$ offers the advantage that the pressure gauge can be used in an enlarged pressure measuring range in a temperature range predefined for the pressure gauge, which pressure measuring range is less than the measuring range lower limit of an identical pressure gauge without deflection device by a value dependent on the amount of the pressure increase $\Delta p(K)$ caused by the force K or the greatest force K and whose measuring range upper limit is equal to the measuring range upper limit of the identical pressure gauge without deflection device 13.

A fluid which is as incompressible as possible and has the lowest possible vapor pressure is preferably used as the pressure-transferring fluid. Suitable for this purpose are, for example, a silicone oil or special liquids which are suitable for this purpose and are known from the prior art. Irrespective of the choice of the fluid, the vapor pressure of the fluid is dependent not only on the internal pressure prevailing in the pressure transmission path 9 but also increases with increasing temperature T. This temperature dependence must be taken into account when the deflection device 13 is being controlled. This can be done, for example, by a corresponding dimensioning of the force K, the upper limit $p_{max}$ and the lower limit $p_{min}$ and leads to a limitation of the temperature range in which the pressure gauge can be used.

Alternatively, however, the vapor pressure increasing with increasing temperature can also be counteracted by the controller 11 being designed such that it controls the deflection device 13 as a function of the temperature $T_{gem}$ measured by means of the temperature sensor TS1, TS2, TS3. In this variant, the temperature sensor TS1, TS2 is preferably arranged in such a way that it is in contact with the pressure-transmitting fluid. For this purpose, the temperature sensor TS1, TS2 can be arranged, for example, in the pressure receiving chamber 7 or in the pressure measuring chamber 35. Alternatively, however, the temperature sensor TS3 can also be accommodated elsewhere in the pressure gauge, for example in an electronics housing 43 surrounding the controller 11. All three positions are shown in FIG. 1 on the basis of the temperature sensors TS1, TS2, and TS 3 in each case shown there as a possible example. Analogously to the previous exemplary embodiment, the controller 11 of the pressure gauge in this variant is optionally preferably designed such that it switches the deflection device 13 on and off as a function of the temperature $T_{gem}$ measured by the temperature sensor TS1, TS2, TS3 connected to the controller 11. In this case, the controller 11 is preferably designed in such a way that it switches on the deflection device 13 when the temperature $T_{gem}$ measured when the deflection device 13 is switched off by the temperature sensor TS1, TS2, TS3 exceeds a predefined temperature upper limit $T_{max}$ and switches off the deflection device 13 when the temperature $T_{gem}$ measured when the deflection device 13 is switched on by the temperature sensor TS1, TS2, TS3 falls below a predefined temperature lower limit $T_{min}$.

In this variant, use is made of the fact that the pressure increase $\Delta p(K)$ caused by the force K in the pressure transmission path (9) counteracts the formation of the gas phase in the same way as a corresponding temperature reduction of $\Delta T(K)$ dependent on the magnitude of the force K would do.

Optionally, the temperature upper limit $T_{max}$ is preferably prespecified to really be higher than the temperature lower limit $T_{min}$. For example, it can be prespecified such that it is the same as the sum of the temperature lower limit $T_{min}$ and the temperature $\Delta T(K)$ which corresponds to the temperature reduction corresponding to the force K. Here, too, a limit value difference H2 between the upper temperature limit $T_{max}$ and the lower temperature limit $T_{min}$ offers the advantage that it is ensured that stable measuring conditions are still present even if the temperature T varies over time around the temperature lower limit $T_{min}$ or the upper temperature limit $T_{max}$ by less than the limit value difference H2.

Optionally, in this variant, the controller 11 can be designed in such a way that it adjusts the magnitude of the force K applied by the deflection device 13 on the basis of the measured temperature $T_{gem}$ and the magnitude of the force K previously applied to the isolation diaphragm 5 or the element connected thereto gradually or continuously.

Control of the deflection device 13 on the basis of the measured temperature $T_{gem}$ offers the advantage that the pressure gauge can be used in an enlarged temperature range, the temperature range upper limit of which is greater than the temperature range upper limit of an identical pressure gauge without deflection device 13 by a value corresponding to the pressure increase $\Delta p(K)$ caused by the force K or the greatest force K with respect to the formation of the gas phase, and whose temperature range lower limit is equal to the temperature range lower limit of the identical pressure gauge without deflection device 13.

However, irrespective of whether the effect of the force is interpreted as a corresponding pressure increase $\Delta p(K)$ or is interpreted as a corresponding temperature reduction $\Delta T(K)$, the effect is present only once. This can be taken into account in the case of pressure gauges in the second variant, for example, in that the measurement range upper limit of the pressure measuring range is set lower by a value corresponding to the magnitude of the pressure increase p (K) caused by the force K or the maximum force K than the measuring range upper limit of a identical pressure gauge without deflection device.

Alternatively, the pressure dependence and the temperature dependence of the vapor pressure of the fluid transferring the pressure can be taken into account by the controller 11 being designed such that it controls the deflection device 13 as a function of the pressure $p_{gem}$ measured by the pressure sensor 1 and the temperature T measured by the temperature sensor TS1, TS2, TS3.

In this third variant, the controller 11 is preferably designed such that, on the basis of the measured pressure p and the measured temperature $T_{gem}$, it determines an auxiliary quantity $G(p_{gem}; T_{gem})$ and switches on the deflection device 13 when the auxiliary quantity $G(p_{gem}; T_{gem})$ determined on the basis of the measured pressure $p_{gem}$ and the measured temperature $T_{gem}$ when the deflection device 13 is switched off falls below a predefined auxiliary quantity lower limit $G_{min}$ and switches off the deflection device 13 when the auxiliary quantity $G(p_{gem}; T_{gem})$ determined on the basis of the measured pressure $p_{gem}$ and the measured temperature $T_{gem}$ exceeds a prespecified auxiliary quantity upper limit $G_{max}$. The auxiliary quantity $G(p_{gem}; T_{gem})$ may be determined, for example, according to: $G(p_{gem}; T_{gem}) = p_{gem} - W(T_{gem})$ by subtracting from the measured pressure $p_{gem}$ a value $W(T_{gem})$ dependent on the temperature, the value of which rises with increasing temperature.

Analogously to the previous exemplary embodiments, the auxiliary quantity upper limit $G_{max}$ can also be prespecified here in such a way that it is genuinely greater than the sum of the auxiliary quantity difference $G_{min}$ and the pressure increase $\Delta p(K)$ that depends on the force K. As an alternative or in addition thereto, the controller 11 can be designed in such a way that it adapts gradually or continuously the magnitude of the force K applied by the deflection device 13 on the basis of the auxiliary quantity $G(p_{gem}; T_{gem})$ and the magnitude of the force K previously applied to the isolation diaphragm 5 or the element connected thereto.

Control of the deflection device 13 on the basis of the auxiliary quantity $G(p_{gem}; T_{gem})$ offers the advantage that the pressure gauge can be used in the enlarged pressure range described above in the entire temperature range of an identical pressure gauge without a deflection device, and the measuring range upper limit of the pressure measuring range only needs to be limited in the partial range of the enlarged temperature measuring range above this temperature range which lies below the measuring range upper limit of the identical pressure gauge without deflection device by the amount of the pressure increase $\Delta p(K)$ caused by the force K or the greatest force K.

Regardless of whether the controller 11 controls the deflection device 13 on the basis of the measured pressure $p_{gem}$ and/or the measured temperature $T_{gem}$, the pressure gauge is preferably designed such that it outputs a pressure measurement result PM that corresponds to the pressure $p_{gem}$ measured by the pressure sensor 1 when the deflection device 13 is switched off, and that when the deflection device 13 is switched on corresponds to a difference between the pressure $p_{gem}$ measured by the pressure sensor 1 and the pressure increase $\Delta p(K)$ of the measured pressure $p_{gem}$ caused by the force K. This pressure measurement result PM can be determined, for example, by a measuring device 45 integrated in the pressure gauge and can be displayed in the form of a pressure measurement value corresponding to the pressure measurement result PM and/or output in the form of an output signal corresponding to the pressure measurement result PM.

Optionally, pressure gauges according to the invention comprising the electromagnet 17 can additionally comprise a deflection measuring circuit 47 which can be connected or is connected to the electromagnet 17 and is designed such that it determines the deflection of the isolation diaphragm 5 dependent on the pressure p acting on the isolation diaphragm 5 when the deflection device 13 is switched off, on the basis of a property of the electromagnet 17 dependent on the deflection of the isolation diaphragm 5, for example the inductance L or a magnitude dependent on its inductance L. In this regard FIG. 1 shows an exemplary embodiment in which the coil 29 is connected to the direct current source IDC via the electronically controllable switching device 41 when the deflection device 13 is switched on and to the deflection measuring circuit 47 when the deflection device 13 is switched off.

In this embodiment, the pressure gauge preferably comprises a testing device 49 that is designed such that it checks the functionality and/or the measurement accuracy of the pressure gauge when the deflection device 13 is switched off on the basis of the pressure $p_{gem}$ measured by the pressure sensor 1 and the deflection of the isolation diaphragm 5 determined in parallel thereto by means of the deflection measuring circuit 47. The testing device 49 can take the form of a separate testing device 49 connected to the deflection measuring circuit 47 and the pressure sensor 1 or the pressure measuring circuit 37 or be integrated elsewhere in the pressure gauge. Alternatively or additionally, the testing device 49 is preferably designed such that it outputs a test result PG of the check and/or triggers a warning or an alarm if the measured deflection and the measured pressure $p_{gem}$ or its rate of change deviate from one another by more than a prespecified tolerance.

The invention claimed is:

1. A pressure gauge, comprising:
    a pressure sensor;
    a pressure transmitter connected upstream of the pressure sensor and having an isolation diaphragm, to the outer side of which a pressure is applied and beneath which a pressure receiving chamber is enclosed; and
    a hydraulic pressure transmission path which is connected to the pressure receiving chamber and filled with a pressure transmitting fluid, and which transmits to the pressure sensor the pressure acting on the outer side of the isolation diaphragm,
    wherein the pressure transmitter includes a deflection device which is controlled by means of a controller connected to the pressure sensor and/or to a temperature sensor and which is designed to apply a force to the isolation diaphragm, or to an element connected to the isolation diaphragm, said force deflecting the isolation diaphragm in the direction of a diaphragm bed, at times that are determined by the controller and that are based on a pressure measured continuously by the pressure sensor and/or a temperature measured continuously by the temperature sensor.

2. The pressure gauge according to claim 1, wherein:
    the isolation diaphragm is magnetic or ferromagnetic or is connected to a magnetic or ferromagnetic element, and
    the deflection device includes an electromagnet which is designed to apply the force which deflects the isolation diaphragm in a direction of diaphragm bed to the magnetic or ferromagnetic isolation diaphragm or the magnetic or ferromagnetic element connected to the separating diaphragm at times predefined by the controller.

3. The pressure gauge according to claim 2, wherein:
    the electromagnet is integrated in the pressure transmitter,
    a coil of the electromagnet is oriented such that an extension of longitudinal axis of the coil runs parallel to a surface normal onto the isolation diaphragm through the center of the isolation diaphragm,
    the coil is arranged such that the coil surrounds externally on all sides a section of the pressure transmission path running from the pressure receiving chamber to the pressure sensor, and/or
    the electromagnet has a hollow cylindrical core which is surrounded at least in sections by the coil and through which an end region of the hydraulic pressure transmission path leading into the pressure receiving chamber extends.

4. The pressure gauge according to claim 3, further comprising:
    a deflection measuring circuit which is connected or is connected to the electromagnet and is designed such that the deflection measuring circuit determines a deflection of the isolation diaphragm dependent on the pressure acting on the isolation diaphragm when the deflection device is switched off, on the basis of a property of the electromagnet dependent on the deflection of the isolation diaphragm, on the basis of an inductance of the electromagnet or on the basis of a magnitude dependent on the inductance of the electromagnet, and
    a testing device designed in such a way that the testing device checks the functionality and/or the measuring accuracy of the pressure gauge when the deflection device is deactivated, on the basis of the pressure measured by the pressure sensor and the deflection of the isolation diaphragm determined in parallel thereto by the deflection measuring circuit.

5. The pressure gauge according to claim 2, wherein the isolation diaphragm consists of a stainless steel or an austenitic stainless steel, or the isolation diaphragm at least in sections or as a whole consists of a magnetic material, of a ferromagnetic material, of a ferromagnetic steel, of a ferritic steel, of a duplex steel or of a superduplex steel.

6. The pressure gauge according to claim 2, wherein the magnetic or ferromagnetic element connected to the isolation diaphragm includes a disk arranged on an inner side of the isolation diaphragm pointing into the pressure receiving chamber, wherein the disk:
    a) consists of a magnetic or ferromagnetic material, of a magnetic or ferromagnetic alloy, of a ferromagnetic steel, of a ferritic steel, of a duplex steel, of a superduplex steel, of iron, of cast iron, of a magnetic or ferromagnetic ceramic, of a ferritic ceramic or of an iron oxide,
    b) is applied as a coating or as a galvanic coating to the isolation diaphragm or is connected to the isolation diaphragm by joining or soldering,
    c) with a material thickness of the isolation diaphragm from 25 μm to 200 μm will have a disk thickness of from 0.1 μm to 500 μm; with a material thickness of the isolation diaphragm from 25 μm to 100 μm will have a disk thickness from 0.1 μm to 300 μm; or with a material thickness of the isolation diaphragm from 50 μm to 200 μm will have a disk thickness from 10 μm to 500 μm, and/or
    d) has a diameter which is less than a diameter of the isolation diaphragm and/or has a diameter from 2 mm to 15 mm when the isolation diaphragm has a diameter from 20 mm to 90 mm, wherein the disk is arranged concentrically with respect to the isolation diaphragm.

7. The pressure gauge according to claim 2, wherein the element connected to the isolation diaphragm comprises a permanent magnet mounted on an inner side of the isolation diaphragm pointing into the pressure receiving chamber.

8. The pressure gauge according to claim 7, characterized in that the permanent magnet extends into an end region of the pressure transmission path adjacent to the pressure receiving chamber, which end region is surrounded externally at least in sections by a coil of the electromagnet.

9. The pressure gauge according to claim 2, wherein the electromagnet is oriented in such a way that the magnetic attraction force appliable therewith to the isolation membrane or the element connected on the inside of the isolation membrane to a central region of the separating membrane comprising the isolation membrane center is maximal in a direction running parallel to the surface normal on the separating membrane through a center of the isolation membrane.

10. The pressure gauge according to claim 1, wherein the controller and the deflection device are designed in such a way that the deflection device is switched on and off by means of the controller and/or the deflection device, when switched on, applies to the isolation diaphragm either a constant force of predetermined magnitude or a force of a magnitude prespecified by means of the controller.

11. The pressure gauge according to claim 1, wherein:
a) the controller is designed in such a way that the controller switches on the deflection device as a function of the pressure measured by the pressure sensor when the deflection device falls short of a prespecified lower limit when the deflection device is switched off and switches off the deflection device when the pressure measured by the pressure sensor exceeds a prespecified upper limit when the deflection device is switched on,
b) the controller is designed in such a way that the controller switches on the deflection device when the temperature measured by the temperature sensor exceeds a prespecified temperature upper limit when the deflection device is switched off, and switches off the deflection device when the temperature measured by the temperature sensor falls short of a prespecified temperature lower limit when the deflection device is switched on,
c) the controller is designed in such a way that the controller:
  c1) determines, on the basis of the measured pressure and the measured temperature, an auxiliary quantity by subtracting from the measured pressure a value which depends on the measured temperature and rises with increasing temperature,
  c2) switches on the deflection device when the auxiliary quantity determined when the deflection device is switched off falls short of a prespecified auxiliary quantity lower limit, and
  c3) switches off the deflection device when the auxiliary quantity determined when the deflection device is switched on exceeds a prespecified auxiliary quantity upper limit.

12. The pressure gauge according to claim 11, wherein:
a) the upper limit is greater than the sum of the lower limit and a pressure increase of the measured pressure caused by the force,
b) the temperature upper limit is greater than the temperature lower limit, or
c) the auxiliary quantity upper limit is greater than the sum of the auxiliary quantity lower limit and a pressure increase of the measured pressure caused by the force.

13. The pressure gauge according to claim 1, wherein the controller is designed in such a way that the controller gradually or continuously adjusts the magnitude of the force applied by the deflection device on the basis of the measured pressure and/or the measured temperature, as well as the magnitude of the force previously applied to the isolation membrane or the element connected thereto.

14. The pressure gauge according to claim 1, wherein the pressure gauge is designed in such a way that the pressure gauge outputs a pressure measurement result which, when the deflection device is switched off, corresponds to the pressure measured by the pressure sensor and which, when the deflection device is switched on, corresponds to a difference between the pressure measured by the pressure sensor and a pressure increase of the measured pressure caused by the force.

* * * * *